Jan. 21, 1964    R. L. GOLD ETAL    3,118,706
RETARDER VALVE AND BRAKE SYSTEM
Filed Nov. 29, 1960    2 Sheets-Sheet 1

INVENTORS.
ROBERT L. GOLD
STEVE SCHNELL
BY Gravely, Lieder & Woodruff
ATTORNEYS.

Jan. 21, 1964     R. L. GOLD ETAL     3,118,706
RETARDER VALVE AND BRAKE SYSTEM
Filed Nov. 29, 1960     2 Sheets-Sheet 2

FIG. 2

INVENTORS.
ROBERT L. GOLD
STEVE SCHNELL
BY Gravely, Lieder & Woodruff
ATTORNEYS.

3,118,706
RETARDER VALVE AND BRAKE SYSTEM
Robert L. Gold, Pine Lawn, and Steve Schnell, St. Louis, Mo., assignors to Wagner Electric Corporation, St. Louis, Mo., a corporation of Delaware
Filed Nov. 29, 1960, Ser. No. 72,400
11 Claims. (Cl. 303—6)

This invention relates generally to fluid pressure systems and more particularly to a brake system having both retarding and service brakes and control means therefor.

In the past, brake systems for trucks and similar heavy duty vehicles were provided with service brakes and retarding brakes, each of which were adapted to be energized in response to the actuation of separate control means therefor, such as application valves. The term "service brakes" refers to conventional brakes which are employed on a vehicle for inertia stopping applications, and the term "retarding brakes" refers to brakes which are employed on a vehicle for retarding or snubbing purposes such as to prevent the vehicle from exceeding a desired speed as on a downhill grade.

An object of the present invention is to provide an improved brake system including both service and retarding brakes and adapted to be operated in response to a singular control or actuation device.

Another object of the present invention is to provide a novel brake system in which the retarding brakes are selectively energized prior to energization of the service brakes.

Still another object of the present invention is to provide a brake system having a retarder valve responsive to fluid pressure applied to the retarding brakes above a predetermined amount to meter pressure fluid to the service brakes.

Briefly, the present invention is embodied in a fluid pressure system having first and second frictional devices, and control means for operating one of said frictional devices in response to predetermined fluid pressure conditions therein. The invention more specifically is embodied in a retarder valve responsive to fluid pressures in vehicle retarding brakes for establishing communication to vehicle service brakes when the applied fluid pressure exceeds a predetermined value. The invention further consists in the parts and in the arrangements and combinations of parts hereinafter described and claimed.

Figure 1:
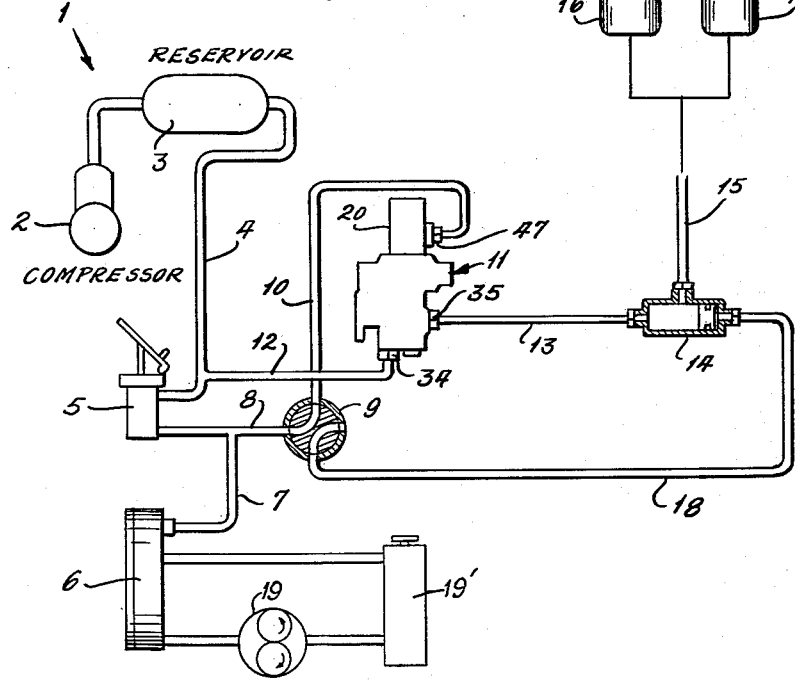
Figure 3:
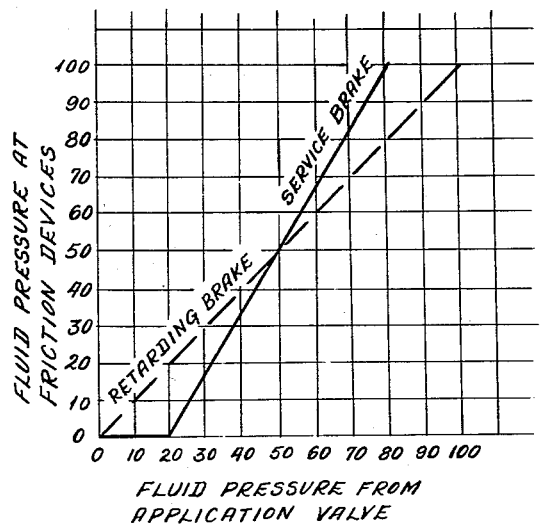

In the accompanying drawings which form a part of this specification and in which like numerals refer to like parts wherever they occur:

FIG. 1 is a diagrammatic view of a fluid pressure system embodying the teachings of the present invention, FIG. 2 is a vertical cross-sectional view of a novel retarder valve in the system, and FIG. 3 is a graphic illustration of representative fluid pressures at the frictional devices of the system during actuation thereof.

Referring now to FIG. 1 of the drawings, the brake system 1 is provided with pressure generating means, such as a compressor 2, which is connected through a reservoir 3 by a conduit 4 to the inlet side of actuation means, such as an application valve 5. The outlet side of the application valve 5 is connected with the actuating port of a friction device or retarding brake mechanism 6 by a conduit 7, and a branch conduit 8 connects the outlet of the application valve with a two-way hand valve 9. In the retarding position, the two-way hand valve 9 normally provides communication between the branch conduit 8 and a conduit 10 connected with the actuation or control port 47 of a control or retarder valve 11. Another conduit 12 is connected between the conduit 4 to the reservoir 3 and the inlet port 34 of the retarder valve 11, and the outlet port 35 of the retarder valve is connected by a conduit 13 to one of the inlets of a two-way check valve 14. A conduit 15 has one end connected with the outlet of the two-way check valve 14 while the other end thereof branches to connect with slave cylinder means, such as power cylinders 16, operatively connected with slack adjusting means 17 of separate friction devices or services brake assemblies (not shown). The other inlet of the two-way check valve 14 is connected by a conduit 18 to the two-way hand valve 9 and is normally vented to atmosphere when the two-way hand valve is in the retarding position as shown.

The retarding brake mechanism 6 is preferably a fluid cooled disc brake having an internal chamber (not shown) through which cooling fluid is circulated by pumping means 19 from a heat exchanger 19'.

Referring now to FIG. 2, the retarder valve 11 comprises an upper housing 20 rigidly secured to an intermediate housing 21 by studs 22 or the like, and a first resilient member or diaphragm 23 having a predetermined pressure responsive area $A_1$ is positioned between the housings 20 and 21 forming an actuation or control chamber B within the upper housing 20. The intermediate housing includes upper and lower portions 24 and 25 between which is sealably secured a second resilient member or diaphragm 26 having a predetermined effective or pressure responsive surface area $A_2$ smaller than the area $A_1$ of the diaphragm 23. A lower housing 27 is rigidly secured to the lower portion 25 of the intermediate housing 21 by the studs 22 with a suitable seal or gasket 28 therebetween. An intermediate chamber C between the diaphragms 23 and 26 is vented to atmosphere and a reaction chamber D is formed in the lower housing 27 by the diaphragm 26.

The lower housing 27 is provided with a bore 29 coaxially aligned with a counterbore 30 and with the diaphragm chamber D, an annular valve seat 31 being formed on the shoulder between the bore 29 and counterbore 30. The counterbore 30 is intersected by a cross-passage 32 one end of which is closed by a plug 33 and the other end being connected with the inlet port 34 to which the conduit 12 from the reservoir 3 is connected. The outlet port 35 intersects the bore 29 and is connected by the conduit 13 to the service brake assemblies through the check valve 14. A valve guide member 36 is threadedly received in the lower end of the counterbore 30 and has a bore 37 in which an inlet control valve 38 is slidably positioned. The inlet valve 38 carries a seal 39 and is normally biased into sealable engagement with the cooperating valve seat 31 by a spring 40 of negligible force. The valve 38 is provided with an axial passage 41 forming an exhaust passage normally in communication with the bore 29 and outlet port 34.

A valve stem 42 is slidably received in the bore 29 and is provided with a metering passage 43 or like clearance to connect the chamber D with the bore whereby the chamber D is normally exhausted to atmosphere through passage 41. The lower end of the stem is normally spaced from the inlet valve 38 and has an annular seat 44 adapted for lost motion sealing engagement with the inlet valve about the exhaust passage 41. The mid-portion of the valve stem 42 is threaded and has pairs of plate members 45 and 46 secured thereto between which the diaphragms 23 and 26, respectively, are mounted.

The upper housing 20 is provided with the actuating port 47 to which the conduit 10 is connected. A pre-loaded or pre-compressed spring assembly 48 is provided with a spring 48a compressed between an abutment member 49 secured to the upper housing and an upper abutment member 50. The upper abutment member 50 is provided with an integral sleeve 50a which extends through the lower abutment member 49, and a retaining nut 50b, threadedly received on the lower end of the sleeve, is normally biased into abutment with the lower abutment member 49 by the compressive force of the spring 48a. The stem 42 extends through the sleeve 50a and threadedly receives an adjusting nut 51 on the upper end thereof, the adjusting nut being normally positioned in abutment with the upper abutment member 50 by the weight of the stem 42 and parts associated therewith. Accordingly, the pre-compressed spring assembly 48 does not normally exert a force on the stem 42, and the threaded engagement between the stem and the adjusting nut 51 serves as an adjustment means for adjusting the distance of travel between the lower end of the stem and the valve seal 39.

In fluid pressure systems for heavy duty vehicles, such as highway trucks, the principal problem in the past has been heat which results in brake fading due to hard or sustained braking applications as when such heavy equipment operates at high speeds or on relatively long downhill grades. Where it is desired to prevent run away or hold a desired speed of the vehicle, even light brake actuation producing retarding or drag conditions has resulted in a high degree of heat and in abrasion and wear of friction materials as in incident of such heat. It has been discovered that such heat can be dissipated by utilizing fluid cooled disc brakes or the like on predetermined axles of the vehicle as the retarding brake devices 6. However, for normal inertia stops, emergency inertia stops and snubbing in traffic, the usual service brake members actuated by power cylinders 16 are provided and the retarding brakes 6 are also operable with the service brakes according to the present invention.

Under normal operating conditions of the system 1 and control valve 11 (with the valve 9 being connected as shown in FIG. 1), an operator applied force to the application valve 5 meters pressure fluid from the reservoir 3 through the conduit 7 to establish a fluid pressure to energize the retarding brakes 6. The pressure fluid also flows through the branch conduit 8, valve 9, conduit 10 and actuation port 47 of the control valve 11 into the chamber B in the upper housing 20 to establish a fluid pressure ($P_1$) equal to that applied in the retarding brakes 6. The pressure $P_1$ acts on the effective area $A_1$ of the diaphragm 23 to create an input or downward force in opposition to the pre-compressed spring force (F) of the spring assembly 48. If the downward force exerted on the stem 42 by pressure $P_1$ acting on the area $A_1$ is less than the compressive force F of the spring assembly 48, movement of the valve stem 42 is prevented and the inlet control valve 38 remains seated to prevent actuation of the service brakes.

When the fluid pressure $P_1$ acting on the diaphragm area $A_1$ is increased to provide a downward force to overcome the force F of the spring assembly 48, the stem 42 is moved downwardly into engagement with the inlet valve seal 39 to initially close the exhaust passage 38, and further downward movement of said stem unseats the inlet valve 38 allowing pressure fluid flow directly from the reservoir 3 through conduits 4 and 12, inlet port 34 and around the valve 38 in the valve chamber formed by the counterbore 30 and bore 29 to the conduits 13 and 15 into the power cylinders 16 to actuate the slack adjusting mechanisms 17 which energize the service brakes (not shown). Pressure fluid also flows in the bore 29 through the passage 43 to establish the fluid pressure ($P_2$) in the chamber D which acts on the effective area $A_2$ of the diaphragm 26 to create the reaction or upward force additive to the spring force F in opposition to the input force $P_1 A_1$. Since the effective area $A_1$ of the diaphragm 23 is greater than the area $A_2$ of the diaphragm 26, a greater fluid pressure $P_2$ is established on the smaller effective area of the diaphragm 26 to provide a reaction force which, when added to the compressive force of the spring 48, is equal to the input force. As a result, the fluid pressure $P_2$ developed in the chamber D and in the service brakes increases in a ratio to the fluid pressure $P_1$ in the chamber B and retarding brakes 6, that is proportional with the ratio of the areas $A_1$ to $A_2$. In other words, the value of $P_2$, during a braking application of an intensity effecting the actuation of the retarding valve 11, may be determined by the formula:

$$P_2 = \frac{A_1 P_1 - F}{A_2}$$

However, it is apparent that when the spring force F has been overcome by the input force, an increase in fluid pressure $P_1$, in the chamber B must be balanced by a greater value of fluid pressure $P_2$ so that fluid pressure to the service brakes increases at a greater rate than fluid pressure metered to the retarding brakes whereby the service brakes assume the greater braking load for more intense brake applications.

Referring now to FIG. 3 wherein a representative brake application is shown graphically, it will be noted that fluid pressures in both the retarding and service brakes increase linearly with increases in the pressure fluid metered through the application valve 5. The retarding brake 6 is actuated directly from the application valve 5 and is operable by itself up to approximately 20 p.s.i. to establish drag conditions for retarding the vehicle. A further increase in pressure fluid metered to the retarding brakes 6 and actuation chamber B of the control valve 11 meters pressure fluid to the service brake line 13. The range of braking pressures for producing inertia stops and snubbing may be approximately between 20 p.s.i. and 60 p.s.i., and emergency inertia stops may be produced by pressures from 60 p.s.i. to 100 p.s.i. It will be noted that each service brake assumes a greater braking load than each retarding brake beginning when the fluid pressure is about 50 p.s.i.

When the reaction force $P_2 A_2$ in the chamber D of the control valve 11 plus the compressive force of the spring assembly 48 becomes equal to the input force $P_1 A_1$, the diaphragm 23 and 26 move the stem 42 to a lapped or poised position with the inlet valve 38, and the inlet valve is also moved into a lapped or poised position with the seat 31. In this position, pressure fluid communication is interrupted between the inlet and outlet ports 34 and 35 and between the outlet port 35 and exhaust passage 41. If a greater braking effort is desired, the applied force on the application valve 5 is increased which effects an increase in the fluid pressure $P_1$ delivered to the retarding valve 11 and retarding brake 6, and said retarding valve is again actuated to increase the fluid pressure $P_2$ delivered to energize the service brakes, as previously described. When the applied force is removed from the application valve 5, the pressure fluid is exhausted from the retarding brake 6 and upper housing 20 of the retarder valve 11 through the application valve 5, and the compressive force of the spring assembly 48 and the reaction force move the diaphragms 23 and 26 and stem 42 to inoperative position which allows the inlet valve 38 to engage its seat 31 and open the exhaust passage 41 to exhaust the pressure fluid from the power cylinders 16 and release the service brakes.

The two-way hand valve 9 may be manually rotated 90° to connect the conduits 8 and 18 and also establish communication between the conduit 10 and the exhaust port of the valve 9. Accordingly, under such conditions it is apparent that both the retarding and service brakes are simultaneously energized in response to actuation of the application valve 5, and that the upper housing 20 of the retarder valve 11 is vented to atmosphere.

It is now apparent that a novel fluid pressure system has been provided in which the application of some friction devices may be retarded relative to the application of other friction devices and in which the control means is responsive to actuation pressures of the latter friction devices. It is also apparent that the ratio of the pressure responsive areas $A_1$ and $A_2$ of control means 11 or the like may be varied to provide different fluid pressure curves for the retarding and service brakes.

The invention includes all changes and modifications of the foregoing disclosure which will be readily apparent to those skilled in the art, and the invention is to be limited only by the claims which follow.

What we claim is:

1. A fluid pressure system comprising a pressure fluid reservoir, fluid cooled retarding brake means and service brake means, an application valve having an inlet connected to said reservoir and an outlet connected to said retarding brake means, a control valve having an inlet connected to said reservoir in by-pass relation with said application valve and an outlet connected to said service brake means, said control valve including a valve member normally preventing communication between said inlet and outlet thereof, and actuation means having a lost-motion connection with said valve member and adapted to move it to meter pressure fluid from said reservoir to said service brake means, said actuation means including pressure responsive means including first and second surface areas in a predetermined proportion, said first surface area being in communication with said outlet of said application valve and subjected to pressure fluid metered to said retarding brake means, said second surface area being in communication with said control valve outlet and subjected to fluid pressures imposed on said service brake means, and a compression spring of pre-selected force acting on said actuation means in opposition to valve member movement thereof.

2. A fluid pressure system comprising a fluid pressure reservoir, retarding and service brake devices, first and second normally closed valve means connected to said reservoir and to said retarding and service brake devices, respectively, said first valve means being selectively operable to meter fluid pressure from said reservoir to energize said retarding brake device, said second valve means being responsive to the metered fluid pressure of said first valve means to apply fluid pressure from said reservoir to energize said service brake device, and means for preventing actuation of said second valve means when the metered fluid pressure of said first valve means is less than a predetermined amount, said means being yieldable to permit actuation of said second valve means when the metered fluid pressure exceeds the predetermined amount.

3. A fluid pressure system comprising a source of fluid pressure, liquid cooled retarding brake and service brake devices, first valve means for selectively metering fluid pressure from said source to energize said retarding brake device, second valve means connected to said source and to said service brake device and normally closing fluid pressure communication between said source and said service brake device, control means for said second valve means, said control means being movable in response to the metered fluid pressure of said first valve means to energize said retarding brake device to move said second valve means and open fluid pressure communication between said source and said service brake device, and resilient means having a substantially constant force to prevent movement of said control means until the metered fluid pressure of said first valve means attains a predetermined magnitude to appreciably retard the energization of said service brake device relative to energization of said retarding brake device, said resilient means having a variable force greater than said constant force to oppose movement of said control means when the fluid pressure of said first valve means is greater than the predetermined magnitude.

4. A fluid pressure system comprising a reservoir, fluid cooled retarding brakes, service brakes, an application valve having a reservoir port connected with said reservoir and a service port connected with said retarding brakes, a retarding valve having a control port connected with the service port of said application valve, an inlet port connected with said reservoir and an outlet port connected with said service brakes, said application valve being operable to deliver fluid pressure from said reservoir to energize said retarding brakes and from said reservoir to the control port of said retarding valve, valve means in said retarding valve normally interrupting fluid pressure communication between the inlet and outlet ports thereof, valve actuating means in said retarding valve responsive to the fluid pressure at said control port above a predetermined appreciable amount to move said valve means and open communication between said inlet and outlet ports and apply fluid pressure from said reservoir to energize said service brakes, and other means for preventing movement of said valve actuating means in response to fluid pressure at said control port below the predetermined appreciable amount.

5. A fluid pressure brake system comprising a reservoir, application means having an inlet connected to said reservoir, fluid cooled brake means connected to the outlet of said application means for retarding braking purposes, service brake means for inertia stopping braking purposes, control means including an inlet connected to said reservoir and an outlet connected to said service brake means, and means in said control means normally preventing pressure fluid communication between said inlet and outlet of said control means and responsive to fluid pressure from said application means above a predetermined amount for metering pressure fluid to said service brake means.

6. In a fluid pressure system including fluid cooled retarder brakes adapted to be actuated in direct response to pressure fluid metered thereto from a pressure fluid source, the combination of service brakes and a control device having an inlet connected to said source and an outlet connected to said service brakes, said control device being subjected to the pressure fluid metered to said fluid cooled retarder brakes and being responsive only above a predetermined appreciable fluid pressure actuating said fluid cooled retarder brakes for developing an inertia stopping fluid pressure in said service brakes in a predetermined proportion relative to the fluid pressure in said fluid cooled retarder brakes.

7. In a fluid pressure system including a retarding brake device adapted to be actuated in direct response to pressure fluid metered thereto from a pressure fluid source, the combination of a service brake device and control means for metering pressure fluid to said service brake device from said pressure fluid source, said control means comprising an inlet connected to said pressure fluid source, an outlet connected to said service brake device, a spring biased valve member normally preventing communication between said inlet and outlet, valve actuating means, and pre-compressed spring means operatively connected with said valve actuating means, said valve actuating means being movable against said pre-compressed spring means in response to a retarding brake device actuating fluid pressure above a predetermined appreciable amount for opening said valve member to meter pressure fluid from said source to actuate said service brake device subsequent to the actuation of said retarding brake device.

8. A fluid pressure system comprising a pressure fluid reservoir, retarding and service friction devices, an application valve for selectively energizing said retarding friction device with pressure fluid from said reservoir, a retarding valve having an inlet connected to said reservoir and an outlet connected to said service friction device and being responsive to said application valve for energizing said service friction device with pressure fluid from said reservoir only when said retarding friction device is energized by a fluid pressure above a predetermined amount, and control means for selectively preventing energization of said service friction device by said retarding valve and effecting substantially concert energization of said retarding and service friction devices by said application valve.

9. A fluid pressure system comprising a source of pressure fluid, retarding brake means and service brake means, application means for metering pressure fluid from said source to said retarding brake means, and control means for metering pressure fluid from said source to said service brake means, said control means including valve means normally closing pressure fluid communication between said source and said service brake means, and valve actuation means in open communication with the pressure fluid metered by said application means to energize said retarding brake means, said valve actuation means being movable in response to metered fluid pressure above a predetermined magnitude for actuating said valve means to provide fluid pressure communication between said source and said service brake means, and means for applying a constant force on said actuation means to prevent movement thereof in response to metered fluid pressure below the predetermined magnitude.

10. A fluid pressure system comprising a pressure fluid reservoir, retarding brake and service brake devices, application means having an inlet connected to said reservoir and an outlet connected to said retarding brake device, a control valve having an outlet connected to said service brake device and an inlet connected to said reservoir, said control device including a spring-loaded valve member normally preventing communication between said inlet and outlet thereof, and actuation means adapted to move said valve member to meter pressure fluid from said reservoir to said service brake device, said actuation means including pressure responsive means including a first surface area in communication with said outlet of said application means and subjected to the fluid pressures of said retarding brake device, a second surface area in communication with said control valve outlet and subjected to fluid pressures imposed on said service brake device, and spring means of precompressed force operatively connected with said actuation means to prevent movement thereof when the fluid pressure acting on the first area of said actuation means is less than a predetermined amount and to oppose valve member movement of said actuation means when the fluid pressure acting on the first area of said actuation means is greater than the predetermined amount.

11. A fluid pressure system comprising a pressure fluid reservoir, retarding brake means and service brake means, application means having an inlet connected to said reservoir and an outlet connected to said retarding brake means, a control valve having a housing with a bore and counterbore, an inlet connecting said counterbore with said pressure fluid reservoir, an outlet connecting said bore with said second friction means, a valve seat between said bore and counterbore, a valve member movable in said counterbore, spring means normally biasing said valve member into engagement with said valve seat to interrupt communication between said inlet and outlet, passage means in said valve member normally venting said bore to atmosphere, valve actuation means including a first pressure responsive area in communication with the outlet of said application means and a second pressure responsive area in communication with said bore, said valve actuation means being adapted to unseat said valve member from said valve seat establishing communication between said inlet and outlet and interrupting communication between said bore and passage means, and a pre-loaded spring cage assembly in abutment with said valve actuation means to prevent movement of said valve actuation means in response to an actuating pressure on the first pressure responsive area less than an appreciable predetermined magnitude whereby said retarding brake means is energized independently of said service brake means, said valve actuation means being movable to overcome the pre-loaded force of said assembly to close said passage means and unseat said valve member when the actuating pressure on the first pressure responsive area is greater than the predetermined magnitude whereby the energization of said service brake means is appreciably delayed relative to the energization of said retarding brake means.

References Cited in the file of this patent
UNITED STATES PATENTS

| | | |
|---|---|---|
| 2,062,167 | Dieter | Nov. 24, 1936 |
| 2,062,500 | Casler et al. | Dec. 1, 1936 |
| 2,545,512 | Campbell | Mar. 20, 1951 |
| 2,725,073 | Edge et al. | Nov. 29, 1955 |
| 2,947,387 | Price | Aug. 2, 1960 |
| 2,985,490 | Gates | May 23, 1961 |